Nov. 7, 1950     J. F. SEBALD     2,528,613
TEMPERATURE CONTROL APPARATUS FOR VENT CONDENSERS
Filed Dec. 20, 1947     5 Sheets-Sheet 1

FIG. 1

JOSEPH F. SEBALD
*INVENTOR.*

Nov. 7, 1950 — J. F. SEBALD — 2,528,613
TEMPERATURE CONTROL APPARATUS FOR VENT CONDENSERS
Filed Dec. 20, 1947 — 5 Sheets-Sheet 2

JOSEPH F. SEBALD
*INVENTOR.*
BY
*Attorney*

Nov. 7, 1950 J. F. SEBALD 2,528,613
TEMPERATURE CONTROL APPARATUS FOR VENT CONDENSERS
Filed Dec. 20, 1947 5 Sheets-Sheet 3

JOSEPH F. SEBALD
*INVENTOR.*

BY *Robt Meyer*
*attorney*

Nov. 7, 1950   J. F. SEBALD   2,528,613
TEMPERATURE CONTROL APPARATUS FOR VENT CONDENSERS
Filed Dec. 20, 1947   5 Sheets-Sheet 4

JOSEPH F. SEBALD
*INVENTOR.*

BY
*Attorney*

Nov. 7, 1950   J. F. SEBALD   2,528,613
TEMPERATURE CONTROL APPARATUS FOR VENT CONDENSERS
Filed Dec. 20, 1947   5 Sheets-Sheet 5

JOSEPH F. SEBALD
*INVENTOR.*

Patented Nov. 7, 1950

2,528,613

UNITED STATES PATENT OFFICE 2,528,613

TEMPERATURE CONTROL APPARATUS FOR VENT CONDENSERS

Joseph F. Sebald, Bloomfield, N. J., assignor to Worthington Pump and Machinery Corporation, Harrison, N. J., a corporation of Delaware Application December 20, 1947, Serial No. 792,889

16 Claims. (Cl. 210—14)

This invention relates to a method and apparatus for preventing the formation of scale in vent condensers such as used in connection with hot process water treating devices and analogous apparatus.

In hot process water softeners of approved design wherein the water to be treated is first passed through a vent condenser to condense the residual steam which is delivered to the vent condenser from the water treating tank, or softener and deaerator, the overheating of the raw untreated water in the vent condenser results in partial softening of the water and precipitation of calcium carbonate due to the absorption of heat by the raw water. Precipitation of calcium carbonate results in the formation of scale in the vent condenser, the water inlet piping from the vent condenser to the water treating apparatus, and in the spray valves through which the water is sprayed into the treating tank of the water softening and deaerating apparatus. Such scale formation results in fouled condenser tubes with a resultant loss in heat transfer and in the fouling of the spray valves to a degree where they become inoperable.

The standard arrangement of vent condenser and hot process water treating apparatus is such that the pounds of steam condenser per pound of water delivered to the water treating apparatus increases with a decrease in load on the water treating apparatus. This results in overheating of the raw water as it flows through the vent condenser and excessive precipitation of scale forming material which coats or scales the tubes of the vent condenser, the water piping from the condenser to the treating tank and the spray valves causing impaired operation and reduced efficiency of the apparatus.

The present invention contemplates means actuated by variances in the temperature of the raw water as it flows through the vent condenser for controlling the delivery of steam to the condenser to provide temperature control for the vent condenser so as to prevent overheating of the water flowing therethrough and the resultant excessive precipitation of scale forming material.

The temperature control above referred to may be provided in a number of different ways, and two such ways are specifically described hereinafter, they being, generically: first, the employment of a differential temperature controller provided with thermal bulbs in the inlet and outlet water boxes of the vent condenser. The controller is set to maintain a constant temperature rise through the condenser by controlling the quantity of steam delivered to the condenser from the water treating apparatus; and second, the use or employment of a temperature controller provided with a thermal bulb in the outlet box only of the condenser for controlling the quantity of steam admitted to the condenser and thus the temperature of the water leaving the vent condenser is maintained constant.

The first of these two methods, namely, the employment of a differential temperature controller in the inlet and outlet water boxes of the vent condenser is for use with water softeners in which the inlet water temperature is subject to seasonal variation and the quantity of precipitate-forming dissolved solid such as calcium carbonate vary inversely with temperature. With the degree of precipitation a function of precipitate forming dissolved solids content and the final temperature, the differential controller controls the maximum temperature of the water leaving the vent condenser in relation to the quantity of precipitate-forming dissolved solids in the water.

The second method, namely, the employment of the temperature controller in the outlet box only of the condenser controls the maximum temperature of the raw water in the condenser independently of the temperature of water flowing to the condenser and is applicable for use in systems using waters which are not subject to change in composition due to temperature. In this case precipitation of scale forming materials will occur at a fixed and predetermined temperature and may be adequately controlled by this method.

With these and other objects in view, as may appear from the accompanying specification, the invention consists of various features of construction and combination of parts, which will be first described in connection with the accompanying drawings, showing a temperature control apparatus for vent condensers of a preferred form embodying the invention, and the features forming the invention will be specifically pointed out in the claims.

The first or preferred arrangement of the equipment employed in the invention and, as shown in Figures 1 to 4 and 6 of the drawings, employs the principle of maintaining a constant temperature rise through the vent condenser for controlling the quantity of steam delivered to the condenser in accordance with a predetermined temperature differential between the water entering and the water leaving the condenser. This is the preferred arrangement inasmuch as the quantity of scale forming material in the water going to the water softening or treating apparatus may vary inversely as the water inlet temperature and the temperature at which the scale forming material will start to precipitate, therefore will vary with the temperature rise of the water flowing through the condenser. Qualitatively the vent condenser will condense a constant amount of steam for any given inlet flow independently of water inlet temperature and the condensing rate is therefore directly proportional to the output of the water treating apparatus, or in other words to the load on the water treating apparatus. Without the temperature control apparatus of the present invention, the standard approved arrangement of the vent condenser is such that the pounds of steam condensed per pound of water flowing through the condenser to the water treating apparatus decreases with an increase in load, or capacity output of the water treating apparatus. This results in overheating of the water at light loads and excessive precipitation of scale forming material with the resulting scaling of condenser and water treating apparatus parts and the lowering of their efficiency.

Referring more particularly to the preferred form of the invention shown in Figures 1-4 of the drawings, the hot process treating apparatus may be of any approved type, many types of which are on the market. That shown, however, is a hot process water treating apparatus for softening and deaerating water such as shown described in claim in Patent #2,379,753, issued July 5, 1945.

Figure 1:
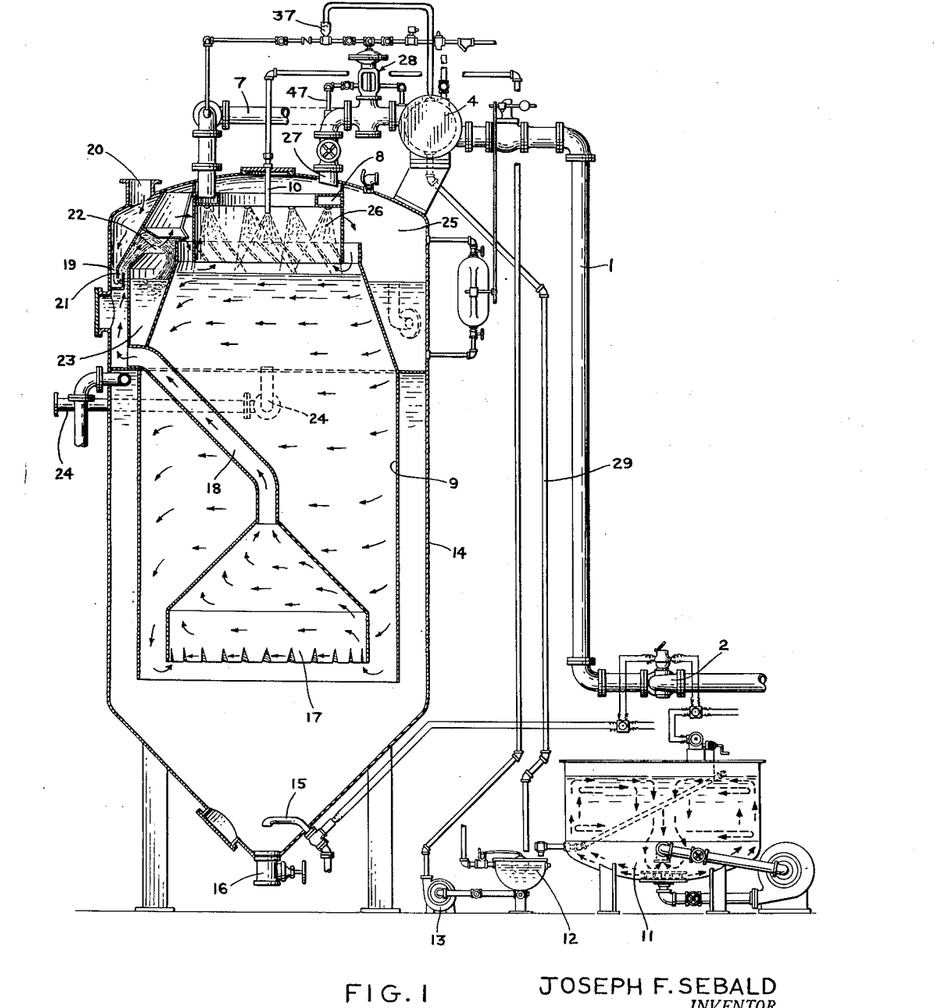
Figure 1 is a side elevation partly in section and partly in elevation of a hot process water treating apparatus having the improved temperature control apparatus for the condenser applied thereto.
Figure 2:
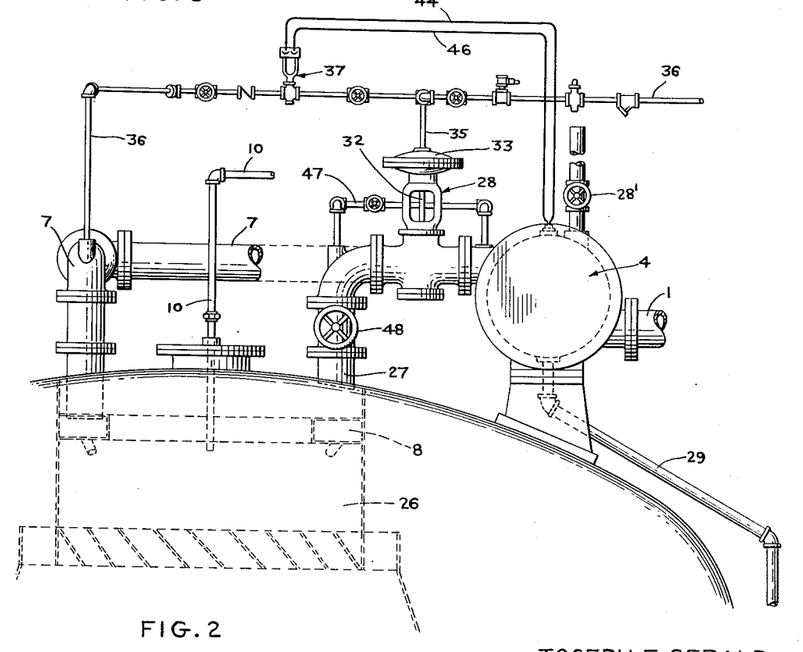
Figure 2 is a side elevation of a part of the hot process water treating apparatus showing the temperature control apparatus and on a slightly larger scale than shown in Figure 1.
Figure 3:
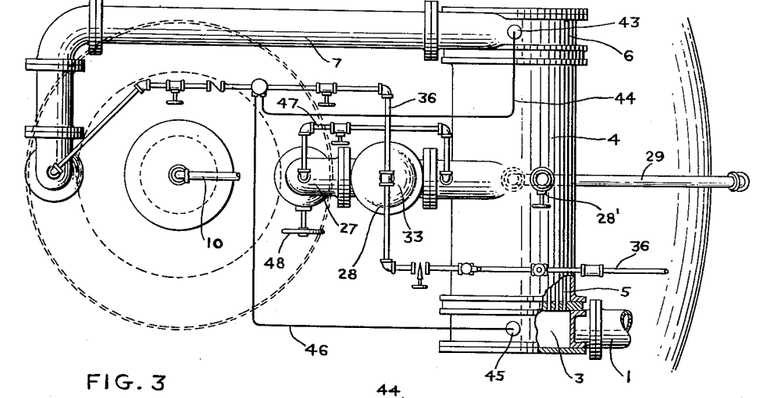
Figure 3 is a top plan of the mechanism shown in Figure 2.

In the particular type of water softening and deaerating apparatus shown, the raw water to be treated passes from the raw water supply pipe 1 under control of a proportioning meter 2 into the inlet water box 3 of the vent condenser 4, passes through the tubes 5 of the vent condenser and into the outlet water box 6. From the outlet water box 6 of the vent condenser 4 the raw water passes through the pipe or conduit 7 to the spray head 8 from which it is sprayed through a multiplicity of spray valves (not shown) into the top of the precipitate preparation zone 9 of the water softening apparatus.

A suitable chemical reagent is sprayed into the precipitate preparation zone 9 through a suitable chemical spray nozzle 10. The chemical reagent is delivered from a chemical mixing and agitating tank 11 such as shown in Patent #2,342,559, dated February 22, 1944, to a chemical dilution and pump suction box 12. From the chemical dilution and pump suction box 12 the chemical reagent is picked up by the chemical pump 13 and delivered to the chemical spray nozzle 10.

As set forth in the above mentioned Patent #2,379,753, the raw water and chemical reagent are thoroughly mixed in the precipitate preparation zone 9 and the foreign material contained in the water is precipitated in this zone and falls to the bottom of the tank 14 from which it is drawn off either by the automatic proportional sludge remover 15 or through the manually operated sludge valve structure 16. The purified water passes upwardly into the treated water uptake cone 17 and from the cone 17 through the pipe 18 into the deaerator structure 19. Steam from any suitable source (not shown) is delivered to the deaerating structure 19 through a steam inlet 20 and this steam mixes with the water in the confined mixing passage 21 and the steam which is not condensed during its passage through the confined mixing passage 21 separates out from the water when the water passes to the relatively low pressure zone 22. The water passes from the low pressure zone 22 in the purified deaerated water storage space 23 being drawn off therefrom through a suitable treated water outlet 24.

The steam which is not condensed in the deaerating action, together with the released oxygen, passes upwardly into the space 25 at the top of the tank 14 and thence into the confined spray chamber 26 where it contacts the incoming sprayed raw water and provides the secondary heating step to facilitate the precipitation of the foreign material from the water in the zone 9.

The steam i. e., the residual steam which is not condensed in the confined spray chamber or space 26 passes through a suitable conduit or pipe 27 into the vent condenser, about the tubes 5 through which the incoming raw water passes. The incoming raw water, being cold, circulates or passes through the vent condenser, acting as the cooling medium to condense the steam in the vent condenser. The liberated gases concentrated in the vent condenser escape therefrom through a suitable vent valve structure 28', while the condensate, that is the steam which is condensed in the vent condenser, flows through the condensate drain pipe 29 into the chemical dilution and pump suction box 12 where it mixes with the chemical reagent delivered to the box 12 from the mixer 11 and is returned to the water softening and deaerating apparatus through the chemical spray nozzle 10.

This is the standard arrangement of the parts found in hot process water treating apparatus and, while a particular type of hot process treating apparatus as shown is shown in the drawings and has just been described, it is to be understood that the invention of the present application is not to be limited to the particular type and construction of hot process water treating and deaerating apparatus shown but that it may be employed with any approved type of such apparatus without departing from the spirit of the present invention.

The present invention comprises means for controlling the delivery of the quantity of residual steam to the vent condenser 4 for the purpose of controlling the heating of the raw water as it passes through the vent condenser and primarily for preventing the precipitation of calcium carbonate from the water due to the absorption of heat by the raw water, with the resulting scaling of the condenser tubes, pipe 7, and spray valves which spray the raw water into the precipitate preparation zone 9.

For this purpose a pressure actuated valve structure 28 is placed in the pipe 27 which delivers the residual steam from the tank 14 to the vent condenser 4.

Figure 4:
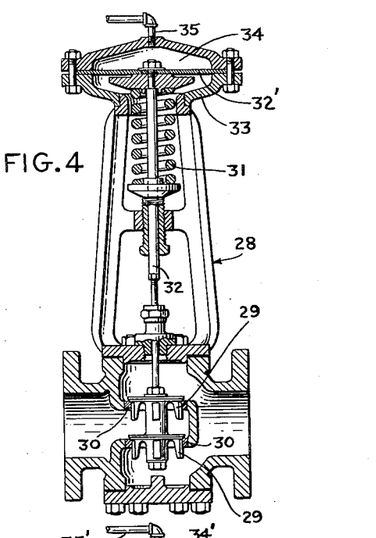
Figure 4 is a detail partly in section and partly in side elevation of one form of the diaphragm or pressure operated steam control valve.
Figure 5:
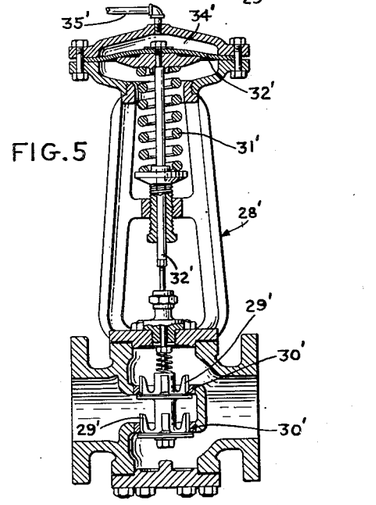
Figure 5 is a detail partly in section and partly in side elevation of a different form of the pressure or diaphragm operated steam control valve.

Two different forms of the pressure actuated valve structure 28 is shown in Figures 4 and 5 of the drawings.

The type of pressure actuated valve structure 28 shown in Figure 4 is a normally open valve structure wherein the valves 29 are held off of their valve seats 30 by means of a spring 31. The valve stem 32 which carries the valves 29 is connected to a diaphragm 32'. The diaphragm 32 extends across a chamber 33 the upper chamber 34 of which is sealed and has connection through a suitable pipe 35 with a pressure fluid supply line 36. The pressure fluid supply line 36 receives a fluid under pressure from any suitable source (not shown) and it discharges into the raw water delivery pipe 7 which delivers the raw water from the outlet water box 6 of the vent condenser 4 to the spray chamber 8.

Figure 6:
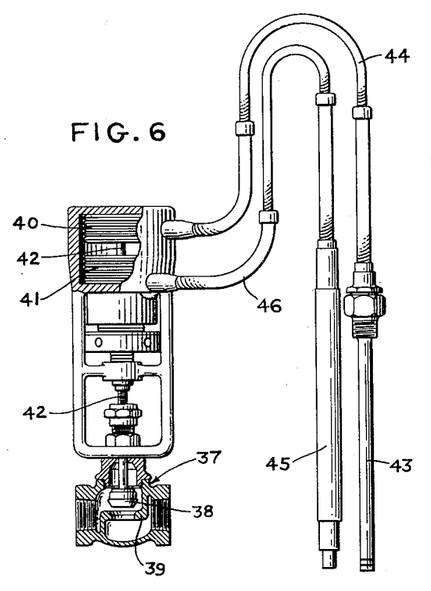
Figure 6 is a detail of the temperature variance operated valve which controls operation of the diaphragm or pressure operated steam control valve.

A temperature controlled valve mechanism 37 shown specifically in Figure 6 of the drawings is mounted in the pressure fluid supply pipe 36 and when the valve 38 of the structure 37 is off its seat 39 or open the pressure fluid flows through the pipe 36 into the pipe 7 without effecting operation of the diaphragm 32 and the consequent operation of the valves 29 and thus the valves 29 will be held open by action of the spring 31 and the full quantity of steam will be permitted to flow from the tank 14 to the vent condenser.

Suitable temperature controlled and operated means are provided for operating the valve 38. Such means are standard products and may be purchased upon the open market. That shown in Figure 6 is commercially known as a Fulton differential regulating pilot and it comprises two metallic bellows structures 40 and 41 which are connected to the valve stem 42 on which the valve 38 is mounted. These bellows structures may have resilient material which acts as springs to hold the valve 38 off of its seat so as to allow the pressure fluid to flow to the pipe 7. A thermal bulb 43 is connected by a suitable flexible conduit 44 with the upper bellows 40 and the thermal bulb 43 is placed in the outlet water box 6 of the vent condenser. A second thermal bulb 45 is placed in the inlet water box of the vent condenser 4 and it is connected by a flexible conduit 46 with the lower box structure 41. The thermal bulbs 43 and 45 are of any approved construction, well known to those skilled in the art and which may be purchased upon the open market. The bellows structures 40 and 41 are tensioned and set to expand under predetermined pressures with a pressure difference between them of any predetermined degree. Merely as an example, the bellows structure 40 may be set to operate or expand at a pressure in excess of ten pounds per square inch and the bellows 41 tensioned and set to expand at a pressure in excess of five pounds per square inch and thus when the temperature rise of the raw water flowing through the vent condenser 4 does not rise above the pressure corresponding to the differential between the settings of the bellows 40 and 41, the spring action of these bellows will act to hold the valve 38 off its seat. As the pressure differential between the temperature of the water entering the inlet box 3 and the temperature of the water leaving the outlet box 6 of the vent condenser increases the pressure within the bellows 40 will increase proportionately causing the bellows 40 to expand and move the valve 38 towards its seat, thus reducing the flow of the pressure fluid through the valve structure 37 and causing an increase of pressure against the diaphragm 32 which will move the valves 29 towards their seats and consequently reduce the quantitative flow of steam to the vent condenser resulting in a lowering of the available heat to the raw water flowing through the condenser and a consequent reduction in the temperature difference between the temperatures of the incoming and outgoing water through the vent condenser. If the temperature difference between the temperature of the incoming and outgoing water of the vent condenser rises sufficiently, both of the valves 38 and 29 will be closed cutting off the supply of steam to the vent condenser through the pipe 27.

A by-pass pipe 47 is connected in the pipe 27 around the valve structure 28 so as to deliver a small quantity of steam to the vent condenser 4 when the valve structure 28 is closed. A manually operated valve structure 48 may be interposed in the pipe 27 if desired.

Figure 7:
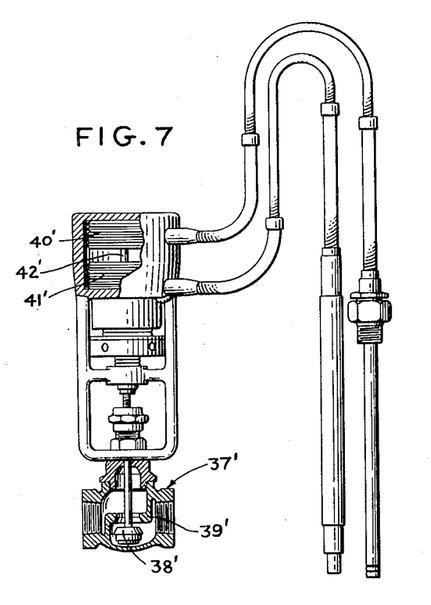
Figure 7 is a detail of a temperature variance operated valve which controls operation of the pressure or diaphragm operated steam control valve, the valve shown in Figure 7 differing slightly from the valve shown in Figure 6.

The alternate forms of the valve structures 28 and 37 shown in Figures 5 and 7 of the drawings are the same as the valve structures shown in Figures 4 and 6 except that the valves 29' are held against their seats 30' by the spring 31' and are moved onto their seats by operation of the diaphragm 32' under action of pressure fluid delivered into the chamber 34' through the pipe 35' under action of the thermal controlled valve 37' shown in Figure 7. In the thermal controlled valve structure 37' shown in Figure 7 the valve 38' is held against its seat 39' by the spring action of the two bellows structures 40' and 41' and is moved away from its seat by expansion of the bellows 40' under increase of pressure therein caused by the rise of the temperature differential between the incoming and outgoing water in the vent condenser. With the alternate forms of valves shown in Figures 5 and 7 of the drawings, the operation of the temperature control apparatus, that is, the control of the delivery of steam to the vent condenser is the same excepting for the reverse manner of operation of the valve structures 37' and 28'.

In the modified form of the invention as shown in Figures 8–11 inclusive of the drawings, an alternate arrangement of the temperature controlled mechanism is shown wherein the quantity of steam delivered to the vent condenser is controlled through suitable apparatus by the temperature of the water leaving the vent condenser for maintaining the temperature of the water at the outlet of the vent condenser constant on the assumption that the quantity of scale forming solids precipitated in the water is independent of the temperature of the water entering the vent condenser. This arrangement would be, in some installations, a satisfactory means of controlling the scale formation.

Figure 8:
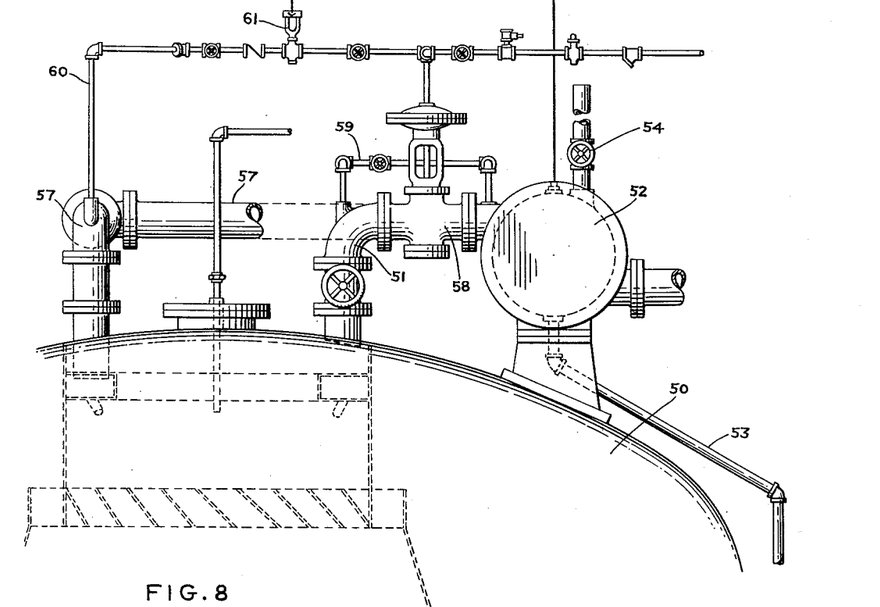
Figure 8 is a side elevation of a modified form of the temperature control apparatus showing it in connection with a fragment of a hot process water treating apparatus.
Figure 9:
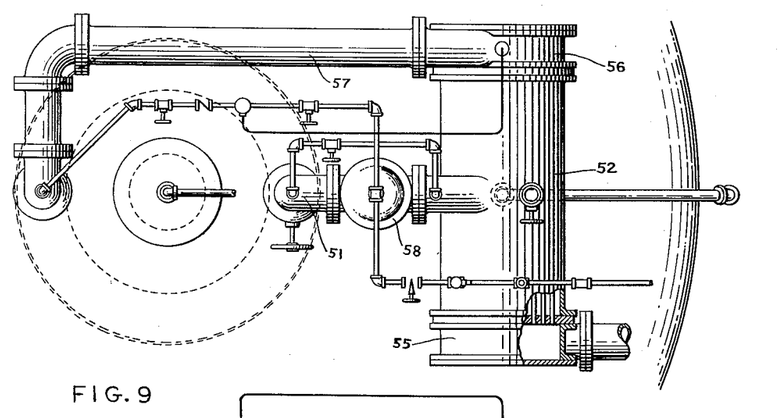
Figure 9 is a top plan of the mechanism shown in Figure 8.

The water softening and deaerating tank structure 50 which is shown fragmentarily in Figures 8 and 9 is the same construction and operates in the same manner as the corresponding structure shown in Figure 1 of the drawings, and this steam and released oxygen from the apparatus 50 passes through the pipe 51 to the vent condenser 52 where the steam is condensed. The condensate flows from the vent condenser 52 through the pipe 53 to the chemical dilution and pump suction box of the apparatus while the released oxygen is vented to atmosphere through a vent valve 54. The raw water passes into the inlet box 55 of the vent condenser, circulates through the tubes (not shown) thereof and into the outlet water box 56. From the outlet water box 56 the raw water is delivered through the pipe 57 to the spray mechanism of the treating apparatus 50. A valve structure 58 is placed in the steam delivery pipe 51. The valve structure 58 is identical in construction with either of the valve structures 28 or 28' as shown in Figures 4 and 5 of the drawings, respectively. A by-pass 59 is provided around the valve 58 to permit a limited quantity of steam to flow to the vent condenser 52 when the valve 58 is closed. The valve 58 is operated in the same manner as hereinbefore described in connection with the valve 28, that is, by the spring or by the diaphragm under control of pressure delivered against the diaphragm through the pressure fluid supply pipe 60. Like in the form of the invention shown in Figures 1–3 inclusive of the drawings, the pressure fluid supply pipe 60 has an outlet into the raw water supply pipe 57. The control of the pressure fluid in the pipe 60 is provided by a valve structure 61. One form, namely, a normally open form of this valve structure 61 is shown in Figure 10 of the drawings; and an alternate form, namely, a normally closed valve is shown in Figure 11 of the drawings.

The valve structure 61 includes the valve 62 cooperating with its seat 63 to control the flow of the pressure fluid therethrough. The valve 62 is carried by a valve stem 64, the upper end of which is, in turn, connected to a metallic bellows 65 which is tensioned so that its spring action will hold the valve 62 off of its seat. A thermal bulb 66 is inserted into the outlet water box 56 of the vent condenser and it is connected by a suitable flexible conduit 67 to the bellows 65 so that when the temperature of the water leaving the vent condenser 52 rises above a predetermined degree the pressure generated in the thermal bulb 66 will expand the bellows 65 and move the valve 62 in closing direction regulating the flow of the pressure fluid through the valve structure 61 and into the pipe 57 in proportion to the temperature rise in the temperature of the water leaving the vent condenser 52. The retarding of the flow of the pressure fluid through the valve structure 61 will cause a proportionate increase of the pressure applied to the diaphragm of the valve structure 58 and will consequently operate the valve structure 58 in direct proportion to the operation of the valve 62 and regulate the quantity of steam permitted to flow into the vent condenser, thus regulating the heat of the water in the vent condenser so as to prevent the temperature rise of the water in the vent condenser to a degree to cause precipitation of the scale forming solids therefrom.

Figure 10:
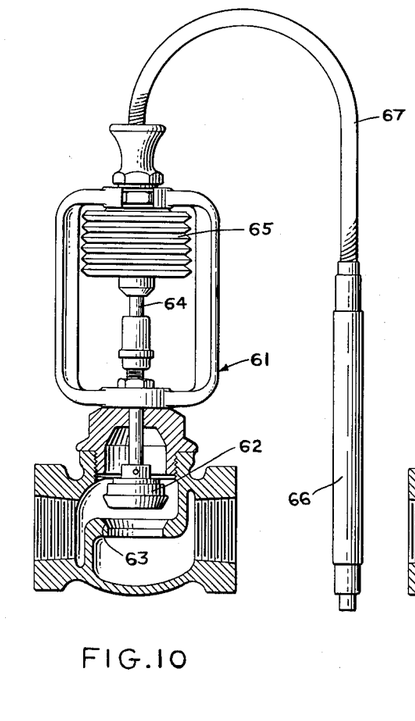
Figure 10 is a detail of the temperature variance operated valve employed in the modified form of the invention as shown in Figure 9.
Figure 11:
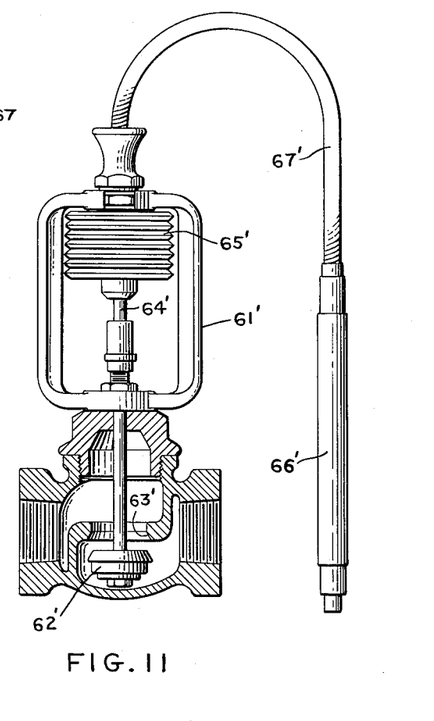
Figure 11 is a detail of a different form from that shown in Figure 10 of the temperature variance operated valve employed in the modified form shown in Figure 10 of the drawing.

The alternate form of the valve structure shown in Figure 11 is just the same as the valve structure 61 shown in Figure 10 except that the valve 62' is reversed so that it will be normally held closed by the spring action of the bellows 65' and forced open by the rise in temperature of the water in the outlet box 56 through the action of the thermal bulb 66'. When the valve structure 61', as shown in Figure 11, is employed then the valve structure 28' as shown in Figure 5 of the drawings is substituted for corresponding valve structure 28 as shown in Figure 4 of the drawings.

It will be understood that the invention is not to be limited to the specific construction or arrangement of parts shown, but that they may be widely modified within the invention defined by the claims.

What is claimed is:

1. In a hot process water treating apparatus, the combination with water softening and deaerating means, means delivering steam to said water softening and deaerating means, a vent condenser, means for delivering residual steam from said water softening and deaerating means to said vent condenser, means for delivering raw water to be treated to said vent condenser wherein it acts as circulating cooling water to condense steam in the vent condenser, and means for delivering the circulating water from said vent condenser to said water softening and deaerating means, of a valve in said residual steam delivery means for controlling the quantity delivery of residual steam to said vent condenser, pressure operated means connected to said valve for operating said valve, means for delivering pressure operating fluid to said pressure operated means, a second valve in said pressure operating fluid delivery means for controlling delivery of operating pressure fluid to said pressure operated means, and temperature operated means controlling operation of said second valve.

2. In a hot process water treating apparatus, the combination with water softening and deaerating means, means delivering steam to said water softening and deaerating means, a vent condenser, means for delivering residual steam from said water softening and deaerating means to said vent condenser, means for delivering raw water to be treated to said vent condenser wherein it acts as circulating cooling water to condense steam in the vent condenser, and means for delivering the circulating water from said vent condenser to said water softening and deaerating means, of a valve in said residual steam delivery means for controlling the quantity delivery of residual steam to said vent condenser, pressure operated means connected to said valve for operating said valve, means for delivering pressure operating fluid to said pressure operated means, a second valve in said pressure operating fluid delivery means for controlling delivery of operating pressure fluid to said pressure operated means, and temperature operated means operated by temperature of water at a predetermined point in said vent condenser for controlling operation of said second valve.

3. In a hot process water treating apparatus, the combination with water softening and deaerating means, means delivering steam to said water softening and deaerating means, a vent condenser, means for delivering residual steam from said water softening and deaerating means to said vent condenser, means for delivering raw water to be treated to said vent condenser wherein it acts as circulating cooling water to condense steam in the vent condenser, and means for delivering the circulating water from said vent condenser to said water softening and deaerating means, of a valve in said residual steam delivery means for controlling the quantity delivery of residual steam to said vent condenser, pressure operated means connected to said valve for operating said valve, means for delivering pressure operating fluid to said pressure operated means, a second valve in said pressure operating fluid delivery means for controlling delivery of operating pressure fluid to said pressure operated means, and temperature operated means operable upon predetermined variances in the temperature difference between the temperature of the water entering and the temperature of the water leaving the vent condenser for operating said second valve to control delivery of operating pressure fluid to said pressure operated means.

4. In a hot process water treating apparatus as claimed in claim 3 wherein the hot process water treating apparatus includes a chemical dilution suction box, and means for delivering the condensate from the vent condenser to said chemical dilution suction box.

5. A hot process water treating apparatus as claimed in claim 1 wherein the water softening and deaerating means includes means for delivering a chemical reagent to the water softening and deaerating means including a chemical dilution and pump suction box and means for delivering condensate from said vent condenser to said chemical dilution and pump suction box.

6. A hot process water treating apparatus as claimed in claim 16 wherein the water softening and deaerating means includes means for delivering a chemical reagent to said water softening and deaerating apparatus which includes a chemical dilution and pump suction box, and means for delivering condensate from said vent condenser to said chemical dilution and pump suction box.

7. In a hot process water treating apparatus, the combination with water softening and deaerating means, means for delivering steam to said water softening and deaerating means, a vent condenser for condensing residual steam from said water softening and deaerating means, a pipe for delivering residual steam from the water softening and deaerating means to the vent condenser, means for delivering raw water to be treated to said vent condenser where it acts as circulating cooling water to condense steam in the vent condenser, and a conduit for delivering the circulating water from the vent condenser to said water softening and deaerating means, of a valve in said residual steam delivery pipe, pressure actuated means connected to said valve for operating it, a pressure fluid supply pipe connected to said conduit, a branch pipe connected to said pressure fluid supply pipe and to said pressure actuated means, a second valve in said pressure fluid supply pipe and located between said branch pipe and said conduit to control flow of the pressure fluid into said conduit, temperature operated means in the vent condenser and operated by temperature of circulating cooling water in the condenser, and means connecting said temperature operated means and said second valve for operating the second valve upon variances in the temperature of the circulating cooling water in the condenser.

8. A hot process water treating apparatus as claimed in claim 7 wherein said temperature operated means includes elements located one near the inlet and one near the outlet of the circulating cooling water of the condenser whereby the second valve will be operated upon predetermined variances between the temperature of the water entering and the water leaving the vent condenser.

9. A hot process water treating apparatus as claimed in claim 7 wherein said temperature operated means is located near the outlet of the circulating cooling water from the vent condenser whereby the second valve will be operated upon predetermined variances in the temperature of the water leaving the vent condenser.

10. A hot process water treating apparatus as claimed in claim 7 including a by-pass pipe having its inlet connected to said residual steam delivery pipe on the upstream side of the valve in said residual steam delivery pipe and its outlet connected to said residual steam delivery pipe on the downstream side of the valve.

11. A hot process water treating apparatus as claimed in claim 7 wherein said temperature operated means includes elements located one near the inlet and one near the outlet of the circulating cooling water of the condenser whereby the second valve will be operated upon predetermined variances between the temperature of the water entering and the water leaving the vent condenser, a by-pass pipe having its inlet connected to said residual steam delivery pipe on the upstream side of the valve in said residual steam delivery pipe and its outlet connected to said residual steam delivery pipe on the downstream side of the valve.

12. In a hot process water treating apparatus, the combination with water softening and deaerating means, means delivering steam to said water softening and deaerating means, a vent condenser, means for delivering residual steam from said water softening and deaerating means to said vent condenser, means for delivering raw water to be treated to said vent condenser wherein it acts as circulating cooling water to condense steam in the vent condenser, and means for delivering the circulating water from said vent condenser to said water softening and deaerating means, of a valve in said residual steam delivery means and controlling the quantity delivery of residual steam to said vent condenser, pressure operated means connected to said valve for operating the valve, a supply conduit connected to said pressure operated means for delivering operating pressure fluid to said pressure operated means, said supply conduit having connection with said water softening and deaerating means for delivering the operating pressure fluid direct into the water softening and treating means at predetermined times without operating said pressure operated means, and temperature operated means connected to said supply conduit and operating to control delivery of the operating pressure fluid to said water softening and deaerating means and cause operation of said pressure operated means by the operating pressure fluid.

13. In a hot process water treating apparatus, the combination with water softening and deaerating means, means for delivering steam to said water softening and deaerating means, a vent condenser, means for delivering residual steam from said water softening and deaerating means to said vent condenser, means for delivering raw water to be treated to said vent condenser wherein it acts as circulating cooling water to condense steam in the vent condenser, and means for delivering the circulating water from said vent condenser to said water softening and deaerating means, of a valve in said residual steam delivery means and controlling the quantity delivery of residual steam to said vent condenser, pressure operated means connected to said valve for operating the valve, a supply conduit connected to said pressure operated means for delivering operating pressure fluid to said pressure operated means, said supply conduit having connection with said water softening and deaerating means for delivering the operating pressure fluid direct into the water softening and deaerating means at predetermined times without operating said pressure operated means, and temperature operated means connected in said supply conduit and operated by temperature of water at a predetermined point in said vent condenser for controlling the delivery of operating pressure fluid to said pressure operated means.

14. In a hot process water treating apparatus, the combination with water softening and deaerating means, means delivering steam to said water softening and deaerating means, a vent condenser, means for delivering residual steam from said water softening and deaerating means to said vent condenser, means for delivering raw water to be treated to said vent condenser wherein it acts as circulating cooling water to condense steam in the vent condenser, and means for delivering the circulating water from said vent condenser to said water softening and deaerating means, of a valve in said residual steam delivery means and controlling the quantity delivery of residual steam to said vent condenser, pressure operated means connected to said valve for operating the valve, a supply conduit connected to said pressure operated means for delivering operating pressure fluid to said pressure operated means, said supply conduit having connection with said water softening and deaerating means for delivering the operating pressure fluid direct into the water softening and treating means at predetermined times without operating said pressure operated means, and temperature operated means connected in said supply conduit and operable upon predetermined variances in the temperature difference between the temperature of the water entering and the temperature of the water leaving the vent condenser for controlling delivery of operating pressure fluid to said pressure fluid operated means.

15. In a hot process water treating apparatus, the combination with water softening and deaerating means, means delivering steam to said water softening and deaerating means, a vent condenser, means for delivering residual steam from said water softening and deaerating means to said vent condenser, means for delivering raw water to be treated to said vent condenser wherein it acts as circulating cooling water to condense steam in the vent condenser, and means for delivering the circulating water from said vent condenser to said water softening and deaerating means, of a valve in said residual steam delivery means and controlling the quantity delivery of residual steam to said vent condenser, pressure operated means connected to said valve for operating the valve, a supply conduit connected to said pressure operated means for delivering operating pressure fluid to said pressure operated means, said supply conduit having connection with said water softening and deaerating means for delivering the operating pressure fluid direct into the water softening and treating means at predetermined times without operating said pressure operated means, a second valve in said supply conduit, temperature operated means located at the water inlet and the water outlet from said vent condenser, and means connected to and operated by said temperature operated means upon predetermined variances in the temperature difference between the temperature of the water entering and the temperature of the water leaving said vent condenser for operating said second valve to control delivery of operating pressure fluid to said pressure operated means.

16. In a hot process water treating apparatus, the combination with water softening and deaerating means, means for delivering the steam to said water softening and deaerating means, a vent condenser, means for delivering residual steam from said water softening and deaerating means to said vent condenser, means for delivering raw water to be treated to said vent condenser wherein it acts as circulating cooling water to condense steam in the vent condenser, and means for delivering the circulating water from said vent condenser to said water softening and deaerating means, of a valve in said residual steam delivery means and controlling the quantity delivery of residual steam to said vent condenser, pressure operated means connected to said valve for operating the valve, a supply conduit for delivering operating pressure fluid to said pressure operated means, said supply conduit connected to said water softening and deaerating means for delivering the operating pressure fluid direct into the water softening and treating means at predetermined times without operating said pressure operated means, a second valve in said pressure fluid delivery conduit, temperature operated means located at the water outlet from said vent condenser, means connected to said second valve and connected to and operated by said temperature operated means upon a predetermined rise in the temperature of the water leaving the vent condenser for operating said second valve to control delivery of pressure fluid to said pressure operated means.

JOSEPH F. SEBALD.

REFERENCES CITED

The following references are of record in the file of this patent:

UNITED STATES PATENTS

| Number | Name | Date |
|---|---|---|
| 427,193 | Schutte | May 6, 1890 |
| 1,638,803 | Gibson et al. | Aug. 9, 1927 |
| 2,168,584 | Rohlin et al. | Aug. 8, 1939 |
| 2,223,634 | Morton | Dec. 3, 1940 |
| 2,241,873 | Yoder | May 13, 1941 |
| 2,273,438 | Entwistle et al. | Feb. 17, 1942 |
| 2,296,325 | Bak | Sept. 22, 1942 |